(12) United States Patent
Woolf et al.

(10) Patent No.: US 7,373,590 B2
(45) Date of Patent: May 13, 2008

(54) SHARED ELECTRONIC INK ANNOTATION METHOD AND SYSTEM

(75) Inventors: Susan D. Woolf, Seattle, WA (US); Roland Fernandez, Woodinville, WA (US); David J. Marsh, Sammamish, WA (US); Wis Rinearson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/676,366

(22) Filed: Sep. 30, 2003

(65) Prior Publication Data

US 2004/0237033 A1    Nov. 25, 2004

Related U.S. Application Data

(60) Provisional application No. 60/471,844, filed on May 19, 2003.

(51) Int. Cl.
   *G06F 17/00*    (2006.01)
   *G06F 3/00*    (2006.01)

(52) U.S. Cl. ................ 715/230; 715/268; 715/751

(58) Field of Classification Search ............... 715/512, 715/541, 500, 751–754, 513, 154; 345/179; 382/120–123, 187, 179
   See application file for complete search history.

(56) References Cited

U.S. PATENT DOCUMENTS

| | | | |
|---|---|---|---|
| 5,729,687 A * | 3/1998 | Rothrock et al. | 709/204 |
| 5,790,818 A * | 8/1998 | Martin | 715/753 |
| 5,859,974 A * | 1/1999 | McArdle et al. | 709/204 |
| 5,938,723 A * | 8/1999 | Hales et al. | 709/204 |
| 6,170,016 B1 * | 1/2001 | Nakai et al. | 709/232 |
| 6,199,076 B1 * | 3/2001 | Logan et al. | 715/501.1 |
| 6,484,156 B1 * | 11/2002 | Gupta et al. | 707/1 |
| 6,546,405 B2 * | 4/2003 | Gupta et al. | 715/512 |
| 6,687,876 B1 * | 2/2004 | Schilit et al. | 715/512 |
| 6,687,878 B1 * | 2/2004 | Eintracht et al. | 715/512 |
| 6,789,109 B2 * | 9/2004 | Samra et al. | 709/220 |
| 6,917,965 B2 * | 7/2005 | Gupta et al. | 709/206 |
| 2001/0042098 A1 * | 11/2001 | Gupta et al. | 709/206 |
| 2002/0042830 A1 * | 4/2002 | Bose et al. | 709/230 |

(Continued)

OTHER PUBLICATIONS

J. Mark Pullen, "Synchronous Distance Education and the Internet", published 98, pp. 1-11.*

(Continued)

*Primary Examiner*—Thu Huynh
(74) *Attorney, Agent, or Firm*—Workman Nydegger

(57) ABSTRACT

A system and method in a computer network in which computer users may make handwritten annotations (to publication pages such as a slideshow slide) public to other computer users, as well as to view public annotations from other computer users. Users can selectively publish authored notes, and subscribe to other user's published notes, as well as see who is subscribing to those notes. An annotation program such as running on a tablet personal computer allows a user to operate in a public mode or a private mode. In the public mode, an author's ink strokes are sent to a server which distributes those ink strokes to subscribers of that author. The architecture provides other useful applications, including a shared canvas mode in which any user annotations corresponding to a publication page are viewable to other users, and a graffiti mode in which annotations are persisted independent of any publication page.

29 Claims, 6 Drawing Sheets

U.S. PATENT DOCUMENTS

| | | | |
|---|---|---|---|
| 2002/0042833 A1* | 4/2002 | Hendler et al. | 709/231 |
| 2002/0046249 A1* | 4/2002 | Shiigi | 709/206 |
| 2002/0078088 A1* | 6/2002 | Kuruoglu et al. | 707/512 |
| 2002/0080170 A1* | 6/2002 | Goldberg et al. | 345/748 |
| 2002/0103708 A1* | 8/2002 | Kloubakov et al. | 705/21 |
| 2003/0009459 A1* | 1/2003 | Chastain et al. | 707/7 |
| 2003/0051128 A1* | 3/2003 | Rodriguez et al. | 713/100 |
| 2003/0163525 A1* | 8/2003 | Hendriks et al. | 709/204 |
| 2003/0214528 A1* | 11/2003 | Pierce et al. | 345/723 |
| 2004/0125133 A1* | 7/2004 | Pea et al. | 345/751 |
| 2004/0163042 A1* | 8/2004 | Altman | 715/512 |
| 2004/0201620 A9* | 10/2004 | Berque | 345/751 |
| 2004/0201633 A1* | 10/2004 | Barsness et al. | 345/864 |

OTHER PUBLICATIONS

Moran et al., "Pen-Based Interaction Techniques For Organizing Material on an Electronic Whiteboard", published 97, pp. 45-54.*

Lee et al., "Developing Collaborative Applications On the World Wide Web", published 98, pp. 141-142.*

Kuo et al., "A Synchronization Scheme for Multimedia Annotation", published 97, pp. 594-598.*

* cited by examiner

SHARED ELECTRONIC INK ANNOTATION METHOD AND SYSTEM

CROSS-REFERENCE TO RELATED APPLICATION

The present invention claims priority to U.S. provisional patent application Ser. No. 60/471,844, filed May 19, 2003 and herein incorporated by reference.

FIELD OF THE INVENTION

The invention relates generally to computer systems and networks, and more particularly to computer systems employing electronic inking capabilities.

BACKGROUND OF THE INVENTION

Contemporary technology such as a tablet PC allows individuals to write notes and other information such as sketches onto their computer screens. Handwriting may be recognized as text, and documents and the like may have annotations added thereto by annotation mechanisms. Annotations may even be searched as if they were text, as generally described U.S. patent application Ser. No. 10/367,198, assigned to the assignee of the present invention. Such electronic searching capabilities provide benefits that are superior to paper notes.

However, while formal electronic documents may be annotated, in other scenarios existing annotation mechanisms still fall short of what users can do with paper. For example, such mechanisms are not able to reproduce the experience of several individuals seated around a table writing directly on a shared paper document. Although a computer user could email an annotated electronic document to other users, the step of emailing removes the immediacy that paper users would experience. It would be highly burdensome and interruptive for a user to have to perform such a file transfer every time the user wrote something down.

What is needed is a way for computer users to exchange electronic ink annotations with other users, in a manner that is essentially immediate and automatic, and handles one-to-many or many-to-many real time situations, such as note taking during a conference. The annotations should be useable with formal documents, but also should be able to be used with any publication, such as a slide of a presentation that appears on a user's computer screen.

SUMMARY OF THE INVENTION

Briefly, the present invention provides a system and method in a computing environment such as a computer network in which computer users are able to make (at least some of) their handwritten annotations public to other computer users, as well as to view notes from other computer users who have chosen to make their notes public. Users can selectively publish authored notes, and subscribe to other user's published notes. A computer user that has made his or her notes public is also able to determine who is subscribing to those notes.

To provide the system and method, a computer user runs a program such as on a tablet-based personal computer, and enters a publication mode, presented to the user as a public data entry area. In this mode, ink strokes are sent to a server, which records the ink strokes in association with the user's identity, and with the current context of those notes, such as a page (e.g., slide) of a publication (e.g., a PowerPoint presentation). The server also tracks what other users have subscribed to public notes corresponding to that identity.

In one implementation, while a user is in the publishing mode, a background thread executing on the user's computer operates to send the stroke data to the server, essentially as it is being entered. A separate background thread communicates with the server to receive and provide the public stroke data of other users to which the computer user has subscribed.

Various color schemes may be employed to help a user differentiate among the user's own notes and notes from others. A user may also filter the view of the shared annotations, so as to unclutter the page and/or narrow down authorship of the notes they are viewing.

The present invention also facilitates other useful applications, including a mode that provides a wholly public persistent space which any computer user can annotate, referred to as a shared canvas. For example, such a space is highly useful in an environment having audience members and speakers, such as to make background comments, project this "canvas" for those present to view a spontaneous sketch or diagram, collect points of view for an informal poll, and so forth. The space is tied to a publication page being presented, such as a slide of a slide show presentation, and typically controlled by one individual, generally the one making the presentation. Another mode provides a graffiti-type wall in which users can add any annotations, independent of any page.

Other advantages will become apparent from the following detailed description when taken in conjunction with the drawings, in which:

DETAILED DESCRIPTION

Exemplary Operating Environment

Figure 1:
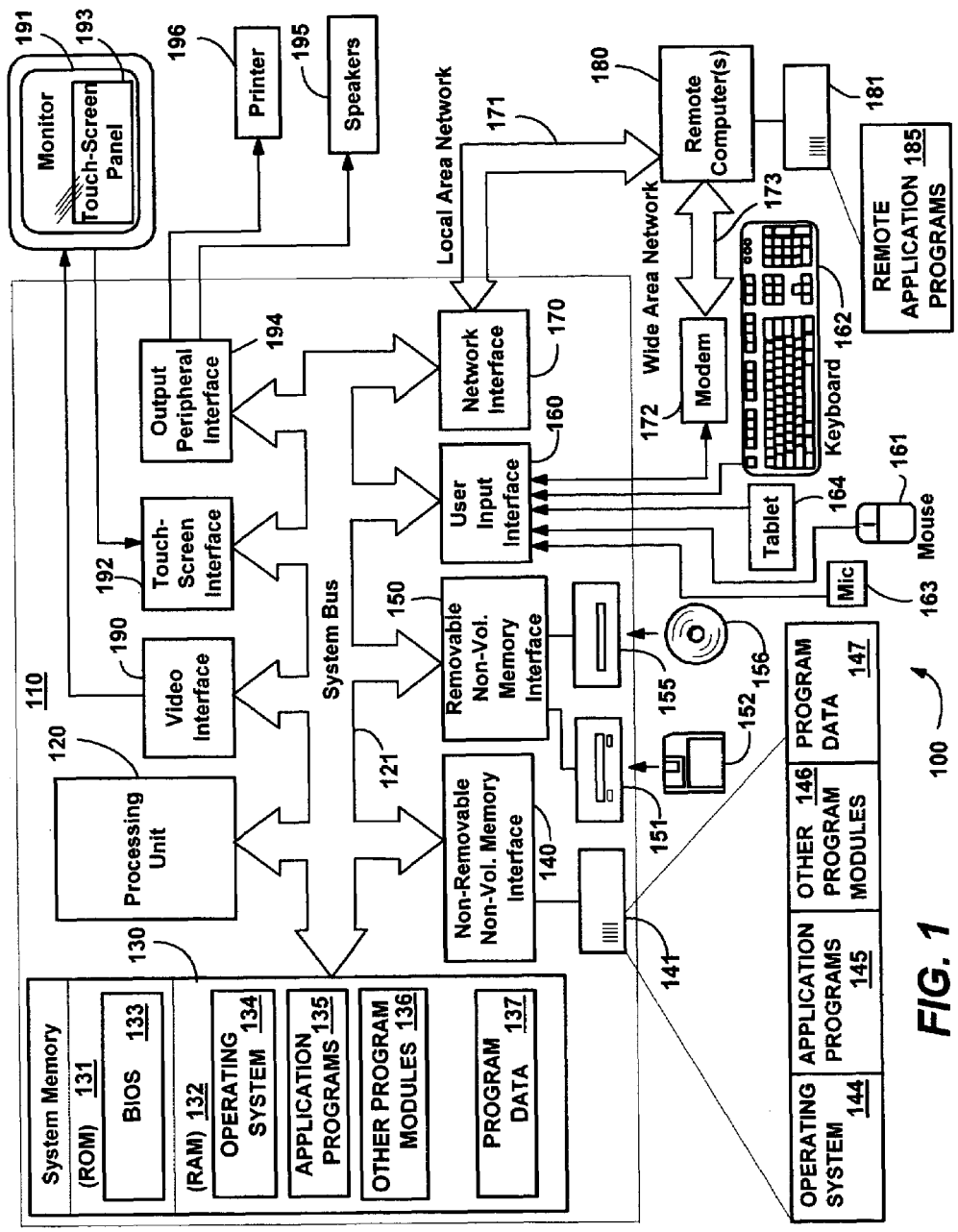
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170, and particularly may include one configured for wireless networking. When used in a WAN networking environment, the computer 110 may also include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Shared Annotations

The present invention, in part, directed towards a method and system that use electronic ink, such as formatted in the form of stroke data, to provide annotations to other computer users. While the examples herein generally refer to handwriting capable devices in the form of portable computer systems such as tablet personal computers, it should be understood that virtually any device capable of transmitting and receiving data can participate in the shared annotation schemes described herein. For example, a user could type notes and send text rather than stroke data to other users, and bitmaps or other image data may also be sent, such as to users that do not have computers capable of interpreting stroke data. A translation mechanism or the like may be used to convert strokes to recognized text and/or bitmaps for such users. Note however that tablet PCs are particularly suited to the present invention, as they provide the advantages of mobility and the benefits of handwritten entry, including more natural input, more expressive comments, and the absence of the sounds of typing. Thus, in a described implementation, ink is sent as stroke vectors to be recreated on individual clients, rather than as bitmap images, generally to reduce network traffic, but in principle could also be transmitted as bitmaps.

Figure 2:
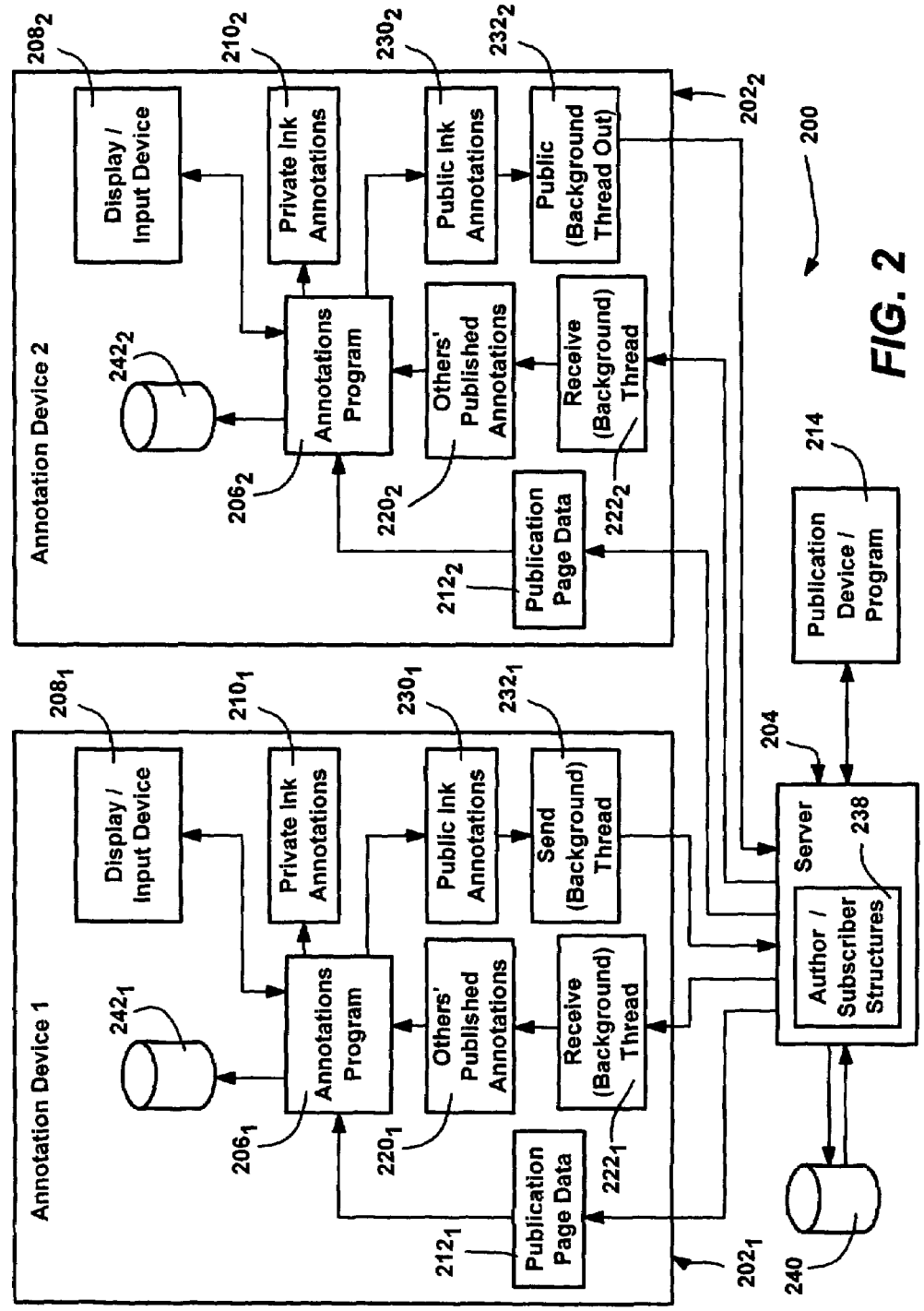
FIG. 2 is a block diagram generally representing a network in which shared annotations have been implemented in accordance with an aspect of the present invention.

As generally represented in FIG. 2, a network 200, which may be wired, wireless or some combination thereof, includes at least two distinct users, each having an annotation device such as a tablet personal computer. In the example of FIG. 2, two such devices $202_1$ and $202_2$ are shown, each connected to an annotations server 204, although a peer-to-peer model is one alternative. Note that the present invention has been designed to operate in a wireless (unreliable and limited bandwidth) network, as well as in a wired environment.

In general, as described below with reference to FIG. 3, the server 204 maintains associations between client publishers (authors) and client subscribers, and also collects the annotation data (e.g., in the form of strokes) from client authors, and transmits that data to client subscribers. Note that although FIG. 2 shows two example devices $202_1$ and $202_2$, it should be understood that the present invention is intended to be able to work with many more than two such devices, essentially any practical number, e.g., limited only by the server capabilities and available bandwidth. For purposes of simplicity, in general one annotation device will be described herein, as the other annotation device includes the same components with respect to annotation capabilities (and thus each device's components differ only by the subscript, which ordinarily will be omitted herein).

Each annotation device 202 includes a client program 206, such as implemented in a custom browser component that uses the Internet Explorer control. The client program 206 launches local pages that are static, and pages that are dynamically obtained from a server, and hosts the shared inking functionality of the present invention, such as implemented in the form of dynamic link libraries (DLLs). The graphics and animations which present the user interface on the display (which in a tablet is also the input device) 208 may be implemented in C# using PNG (Portable Network Graphics) files with regions of low alpha blending used to increase the size of hit areas (tablet styli can be problematic for users to target accurately) or a custom application which manipulates layers. Note that one implementation of the present invention has been designed to operate on various types of displays, including devices with lower graphic capabilities.

In accordance with an aspect of the present invention, a user is able to enter various modes of the annotations program 206, including a private mode in which users can see others' public annotations on the display 208 but no other users can see the private ink annotations data 210. Such a mode, which can be selected via buttons 402 and 410 (FIG. 4) or the like, is generally presented to the user in a manner that indicates that the user is not currently public, such as in the display 400 of FIG. 4. In this mode, a user can see the ink annotations of other users, (such as the writing "Hello Joe" in FIG. 4, but any private ink (such as the writing "Private ink") entered is not sent to the server 204. Note that although not readily apparent from FIG. 4, it should be understood that different color ink displays may be provided to differentiate a user's own ink (e.g., black) from that of others (e.g., blue), and/or differentiate the ink of others (e.g., blue for one other user's notes, green for another's notes, and so forth). A default color scheme may be provided, as described below, and the color scheme may also be user customizable.

Figure 4:
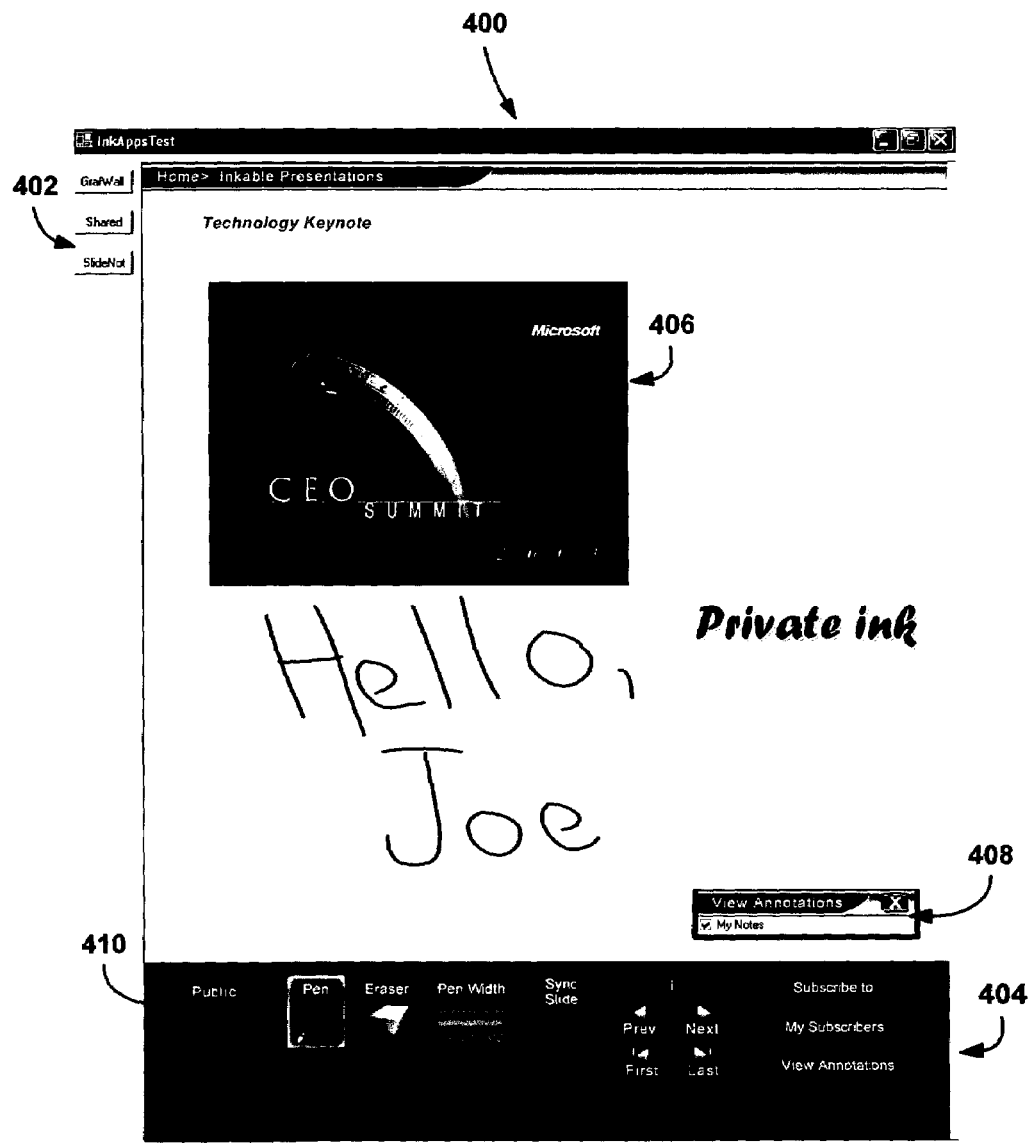
FIG. 4 is a representation of a program display showing an example interface for receiving and publishing presentation-related public annotations, in accordance with an aspect of the present invention.

As also represented in FIG. 4, other buttons 404 are available, including a "Subscribe to:" button for controlling to which others the client user is subscribing in order to see their ink annotations. Another of the buttons 404 is provided for obtaining (from the server) a list of any other users who have subscribed to see this user's public ink, and a third button in the button set 404 controls which annotations are presently to be displayed on the current user's display. Note that in one implementation, the ink annotations are on a per-page basis, and can accompany essentially any page of data, such as the graphic image 406 presented via a slideshow or the like. Note that the page of data may be a word processing document, a spreadsheet, and so on, (possibly allowing collaborative text editing), and that ink annotations may be added atop the publication page data as well as above, below and to the side of the page image. As shown in FIG. 2, the server 204 may provide this publication page data 212, e.g., as received from a publication device (e.g., running a presentation program) 214, in advance or dynamically, or the user may obtain it from another means, such as directly from the publication device 214 or possibly via a CD-ROM provided prior to a presentation. Note that the publication device 214 tells the server its current publication and page whenever changed, whereby the server 204 can notify the clients of a change. Clients change publications and pages on demand, however it is feasible to have a model in which the server automatically controls the publication page that the clients see.

Controlling subscriptions to others' ink annotations is essentially performed by communicating with the server to obtain a list of other users (authors), as initiated via one of the buttons 404, e.g., the "Subscribe to:" button. One or more other authors may be selected from this list, such as via a checkbox or the like, and the selection or selections returned to the server for associating any selected authors' identities with the subscribing user. A model in which a user can subscribe to his or her own published annotations is feasible, such as to see what those other subscribers are seeing without private data also appearing. The list of available authors may be filtered in some way, such as to include only those users who have provided public data, however the list may include every participating user including those with no public annotations, thereby allowing a user to subscribe in advance in the event that a user decides to later make some annotations public. Time-based filtering is also possible, e.g., show the private annotations along with the public annotations of user X and user Y as of a certain time.

A user can also use the buttons 404 (e.g., the "My Subscribers" button) to see which other users are subscribing thereto. Because the server maintains the associations on a per-user basis, this information is readily available from the server via a straightforward lookup. Note that although not necessary to the present invention, it is straightforward to provide a model in which a user can deny selected other users the ability to see his or her ink annotations, e.g., a semi-private mode of operation, either in advance or once the user realizes that another viewer is viewing his or her public annotations.

Another of the buttons 404 provides a "View Annotations" selection screen. This is essentially a filter mechanism, where the user can select "My Notes" and/or the notes of one or more other users for display. A checkbox on a window 408 may be used to provide an easy-to-use interface; (note that in the example of FIG. 4, the window 408 does not exactly correspond to the displayed ink, as there would be a selected checkbox for the source of the "Hello Joe" ink annotation) in order for that public ink of another to be displayed. In general, a user's own ink and the ink of others are maintained separately, and thus various layers of ink may be selectively overlaid into a resultant display.

To see the public ink annotations 220 (FIG. 2) of other users, in one implementation, a receive background thread 222 communicates with the server 204, identifying the user. In turn, the server returns the other users' published annotations 220 to which that user has subscribed. This communication may be periodic, such as every few seconds, but may also be on demand to an extent and thus more immediate at certain times, such as whenever a user subscribes to a new author, or uses the view annotations interface checkbox to add an existing author's annotations 220 to the current view. Buffering is performed as appropriate.

In accordance with another aspect of the present invention, another state is provided in the slide notations mode in which a user's notes are made public to other subscribers. This mode may be entered via a public button 410. Although not separately shown, as described below with reference to FIG. 5, a number of indications are provided to a user whenever a user is in such a publishing state, to prevent a user from making a note that the user intends to be private inadvertently become visible to others.

In general, entering this public state while in the slide notations mode makes the user's subsequent ink strokes (annotations) publicly available to subscribers. Once the user exits public mode, the user's published public annotations persist on the other clients and the user's subsequent ink strokes (annotations) are once again private. As represented in FIG. 2, to this end, public ink annotations 230 are communicated to the server 204 via a background thread, referred to herein as a send thread 232 (although it is understood that the thread can perform other operations beyond data transmission, including collecting and buffering the public data to send). Note that such stroke data may also include data that erases previous stroke data. In general, the background thread gathers stroke data for public ink annotations and sends that ink to the server 304, such as by transmitting the data once every few seconds, and/or as public annotations data 230 becomes available. It should be understood that a separate background thread is only one way to provide the data, and that any other suitable mechanism is equivalent. In general, the data transmission typically identifies the user, identifies the user's current context (e.g., publication name and page), and provides the annotations in the form of stroke data to the server 204, for distribution to subscribers, as described below. As described below with reference to FIG. 3, the server tracks the public stroke data per user and context, such as in author and subscriber data structures 238.

Figure 5:
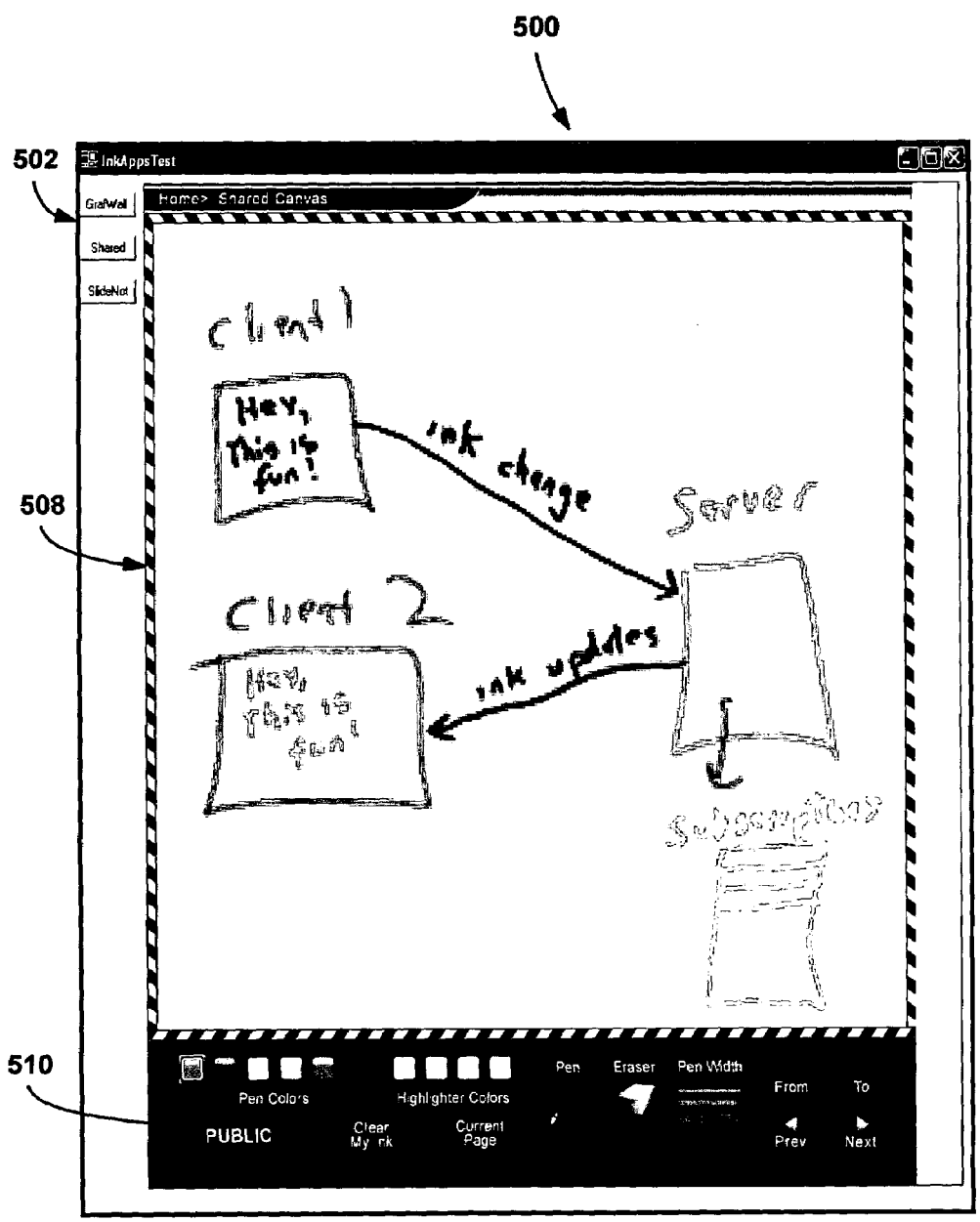
FIG. 5 is a representation of a program display showing an example of how a user can publish notes to a shared canvas, in accordance with an aspect of the present invention.

In accordance with another aspect of the present invention, another useful annotations mode is a shared mode, also referred to as a shared canvas mode, as represented in FIG. 5 by the displayed page 500. In general, the shared canvas mode allows multiple users (any user who wants) to see each others' notes that are written on a what appears to be a common display surface. In essence, every user who writes data to a shared canvas page $352_1$-$352_j$ (FIG. 3) is a published author, and every user is automatically a subscriber; the user need only enter the shared canvas mode to participate. As with the public state when viewing a slide in the slide annotations mode, when in the shared canvas mode, a number of safeguards are provided so that the user is aware of the public state, including a visibly conspicuous (e.g., red and white) graphic border 508, and a public state selector/indicator 510 being illuminated. Other indications such as flashing warning are equivalent. Note that in one implementation, the shared canvas mode is not strictly anonymous, since any user can choose to only show one layer of ink at a time using the display filter, and thereby determine the source of a certain set of strokes. It is also feasible to have a bubble or the like pop up when hovering over ink to identify the source of that particular ink, and/or as ink is being added to the shared canvas.

Also, although not apparent in FIG. 4 or FIG. 5, a user's ink color may be made to automatically change when initially switching from public mode to private mode and vice-versa, although the user can manually change colors thereafter. For example, in one scheme, the user interface for the presentations portion uses the convention that the user's own ink is represented in black, though the user can change pen width or erase ink on a per stroke basis. When that user chooses to publish ink annotations by clicking on the public button, the ink becomes red as a reminder that what is being written is viewable by others. If subscribed to receive other users' ink, the ink may be represented in blue.

In general, the shared canvas mode is per-page corresponding to a page being presented, as controlled by the current presenter or a discussion moderator. As apparent from the example spontaneous, collaboration sketch/diagram shown in FIG. 5, such a shared canvas mode/page is highly useful to multiple user environments, such as an audience participating in a presentation or the like, as collaboration is automatic. A presenter can also find this highly useful, such as to conduct an informal survey, which is more anonymous than via a show of hands, and can provide more than simple yes no answers, e.g., users can mark an X where the believe they fit on a graph regarding some issue.

The presenter can clear the shared canvas by switching to another page, however that previous shared canvas may be persisted so that the shared notes for that page may reappear if the presenter goes back to the corresponding page. The presenter can also erase the page as desired, again possibly after persisting one or more states of that shared canvas. Note that the server is associated with a non-volatile storage mechanism 240, and each annotation device has a non-volatile storage mechanism 242. Thus, annotations may be persisted and recalled at the server 204 or a client 202 as needed, such as if the presenter goes back to a previous page. A user of an annotation device 202 can also operate offline and synchronize when online at a later time, and so on. To synchronize, a client author resends changed/new ink strokes and subscription list changes made while offline to the server when back online, and if the server goes down, upon restart the server broadcasts its availability.

Figure 6:
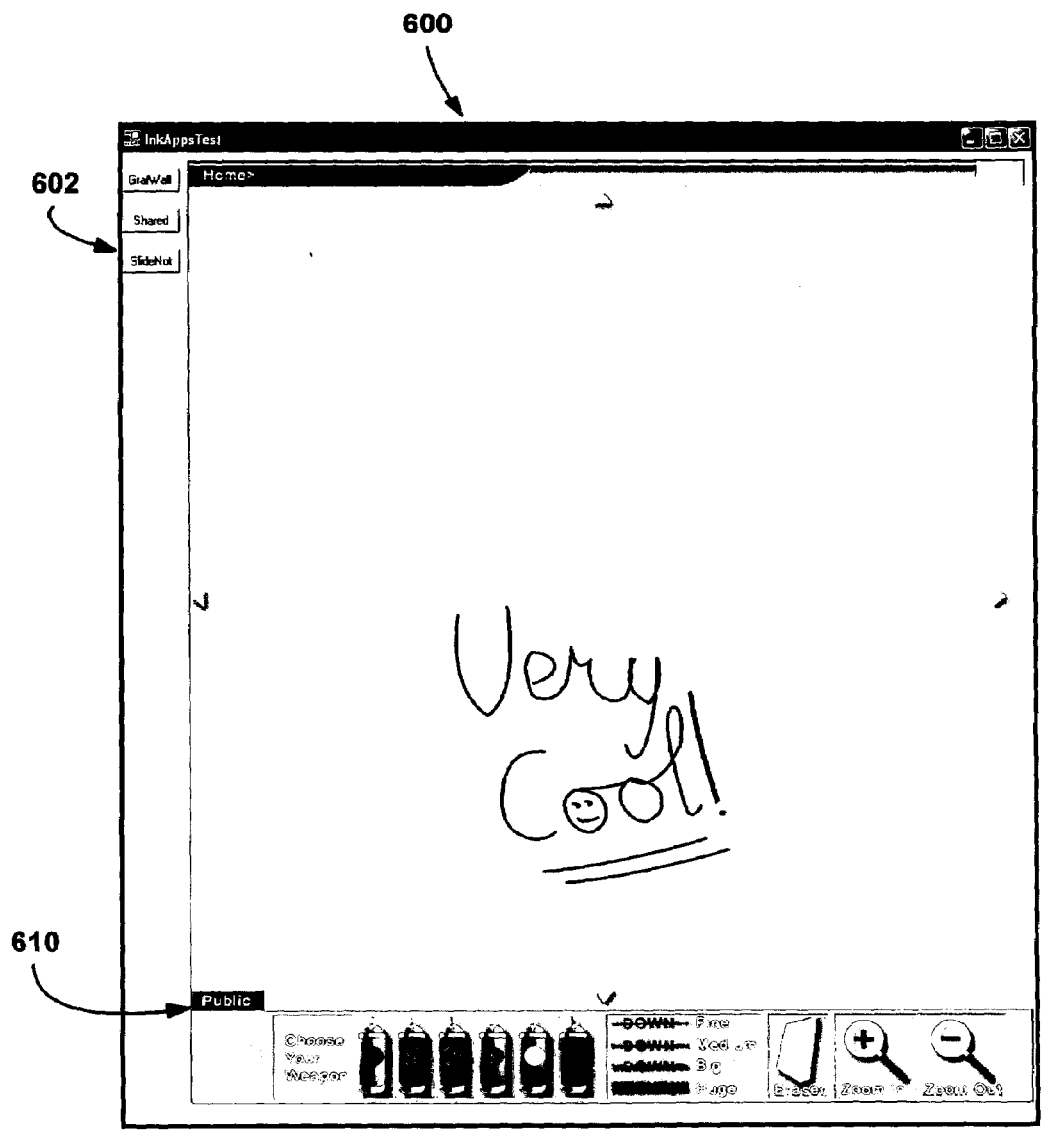
FIG. 6 is a representation of a program display showing an example of how a user can publish notes to any other user, including non-subscribers, in accordance with an aspect of the present invention.

Yet another mode is a graffiti-type mode, represented via FIG. 6, in which users write to a canvas (graffiti page) 600 that is like the shared canvas, except that the graffiti page is not cleared, (at least not ordinarily), although a user can erase displayed ink. Thus, such a graffiti page is not per-page of a publication, but rather is a public data space (e.g., maintained on the server 350, FIG. 3) accessible to every participant to add annotations and view the annotations of others, which may be per-publication, or per some other unit, such as the same page being available throughout an entire conference filled with multiple publications. Again, some indication of the public state is provided, such as an illuminated indicator 610, a different background (bricks instead of lines) and so forth. The displayed wall may be scrolled, zoomed and so forth. Note that because ink in this mode is always public, a much greater variety of colors may be provided since the colors scheme need not reserve colors for distinguishing between public versus private versus others' ink.

Figure 3:
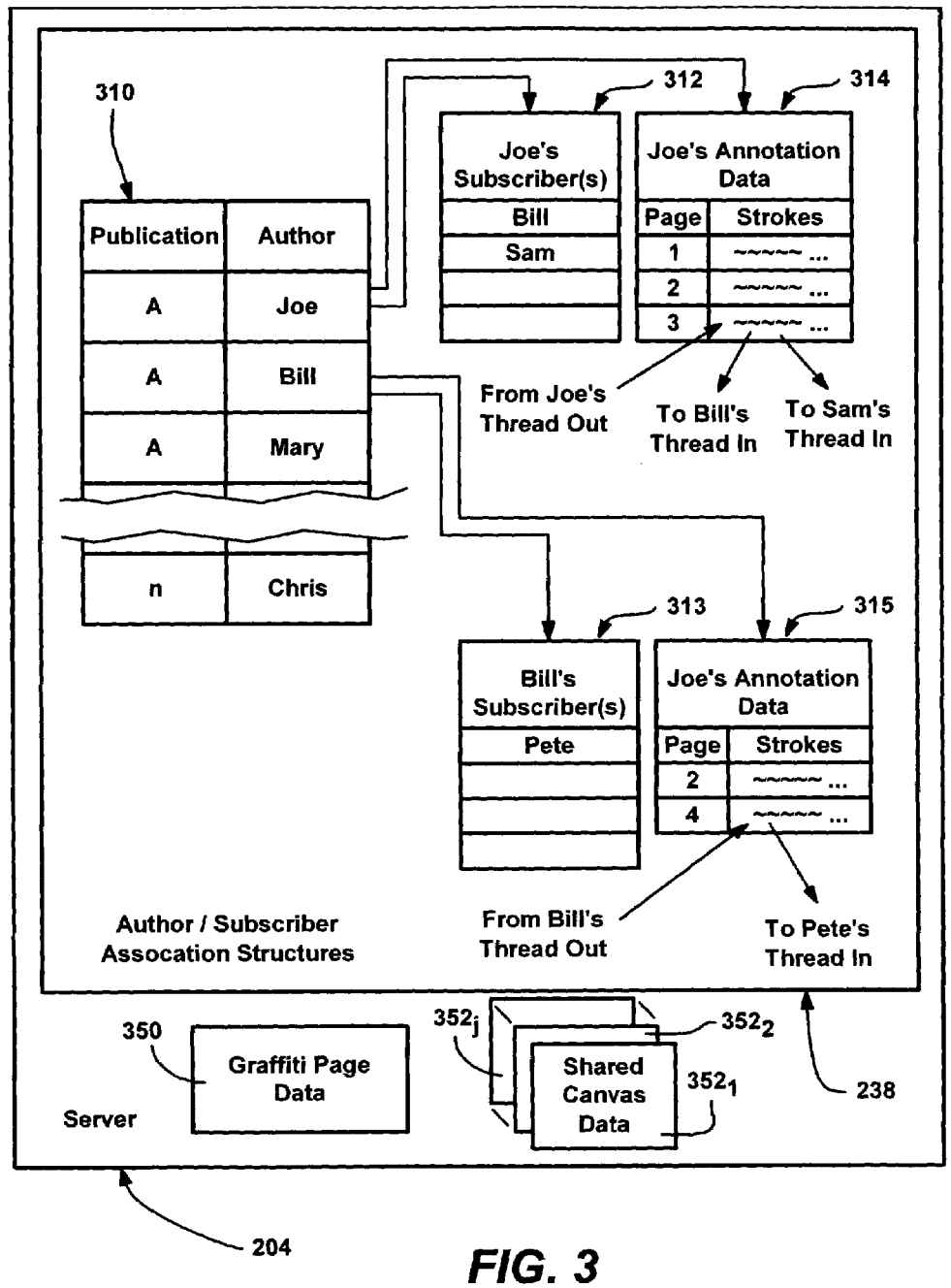
FIG. 3 is a block diagram generally representing data structures used by the server to track publishers (annotation authors), their public annotations, and subscribers, in accordance with an aspect of the present invention.

Turning to an explanation of the present invention with particular reference to FIG. 3, whenever a client subscribes for receiving another users' public annotations, the server 204 associates that client subscriber with the annotation publisher (author) and his annotations for the specified document. For example, each publishing user may be listed in a table 310 (on a per-publication basis), with a pointer to a per-author table 312 (or 313 and so on) of that author's subscribers. In this particular implementation, another table 314 (or 315 and so on) also having a pointer thereto from the table 310 contains the stroke data for that publication and author on a per-page basis.

Thus, whenever a background send thread provides published stroke data, the thread also provides the user identity and current context (publication and page), and the server adds the stroke data to the correct location in table 314. Note that shared canvas and graffiti data modes need not identify the user, but instead the server can simply merge the data into an appropriate set of shared stroke data 350 or 352 from multiple users, with shared canvas data being associated with a page ($352_1$-$352_j$), but not a user (in an anonymous model), and graffiti data simply added to a collection of strokes 350, which may be per publication, or multiple publications (e.g., for an entire conference having multiple presentations), or on any other suitable basis.

In one implementation, the present invention essentially operates as a push model, in which the server sends ink to subscribing clients' receive threads whenever changed ink is received from a publishing client. This is to avoid having the user wait for updates when switching to a page, and is particularly beneficial in a wireless environment, where the network may be disconnected or unreliable for any user.

For each author from which strokes are received, the author (e.g., Joe) can be found in the table 310, and the author's stroke data appropriately stored in the table 314, and returned by the server to subscribers located via the table 312.

An alternative pull model is also possible, in which a user's receive thread requests published stroke data. In such a model, the receive thread identifies the requesting user, along with a publication, page and each author to which the user is currently subscribed (or at least seeking the public data thereof, e.g., to reduce network load, the user can only seek the data of those other users who are also selected for viewing rather than all authors to which that user has subscribed). The table 312 can be used to make sure that the requesting client has subscribed to the identified author. Users can provide a page and request shared canvas data, or can request graffiti data, and/or the server can update users as appropriate, e.g., by periodically sending deltas.

Note that in the alternative pull model, it is also straightforward to have the server track the authors for a subscriber, whereby the subscriber would not need to list the authors but instead would automatically receive the stroke data for each subscribed-to author. This would reduce the information that the receive thread had to provide with its request, however this would likely increase network load because stroke data would be returned for authors that the client has subscribed to but may not be currently viewing the annotations thereof.

As described above (e.g., with reference to the "My Subscribers" button), one other set of data that a client may receive in response to a request is a list of other user's that have subscribed to that client's public annotations. Thus, in the example of FIG. 3, the client author named "Joe" may request that the server return a list identifying his current subscribers, whereby the server 204 can access the table 312 to find and return this information. In the example of FIG. 3, this would be Bill and Sam at the present moment. As can be readily appreciated, this information may be used in other ways as well, such as to allow any user to see another author's subscribers, to see which author was the most subscribed-to author, and so on.

As can be seen from the foregoing detailed description, there is provided a method and system for sharing annotations that provides benefits like paper notes but further provides the advantages of computerized operations such as storage, remote distribution and so forth. Annotations are selectively made publicly available as they are authored in a manner that handles one-to-many and many-to-many real time situations. The annotations are useable with any publication.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment for propagating annotations to electronic documents among a plurality of users' computers, a method for sharing handwritten annotation data related to one or more pages of a document among a plurality of users' computers associated with the document, the method comprising:

an act of receiving a first user's handwritten annotations from the first user's computer among a plurality of users' computers, each of the users' computers having annotation access to a public data entry area available to each of the plurality of users' computers, the public data entry area being configured for sharing handwritten annotations received from one or more of the plurality of users' computers with one or more other of the plurality of users' computers such that the received handwritten annotations appear to be written on a common display surface shared among the plurality of users' computers in real time;

an act of determining in a first determination that the first user's handwritten annotations are public data;

an act of automatically writing the handwritten annotations of the first user to the public data entry area in response to the first determination that the first user's handwritten annotations are public data;

an act of displaying a list of users who provided public data;

an act of receiving at least one subscription request from one or more of the plurality of user's computers to subscribe to the first user's handwritten annotations in response to a selection of the first user in the list of users who provided public data;

an act of adding at least one of the plurality of users to a list of subscribers that are subscribed to access the first user's handwritten annotations based on the received at least one subscription request;

an act of displaying on the first user's display the list of subscribers to the first user's handwritten annotations;

an act of determining in a second determination that the first user has indicated in the displayed list of subscribers that one or more of the subscribers that are subscribed to the first user's handwritten annotations is to be denied subscription to the first user's handwritten annotations;

based on the second determination, an act of selectively denying on a per-user basis the one or more of the subscribers indicated by the first user to be denied subscription to the first user's handwritten annotations from being added to the list of subscribers that are subscribed to access the first user's handwritten annotations;

an act of distributing the first user's handwritten annotations to computers of users who are on the list of subscribers to access the first user's annotations; and an act of preventing distribution of the first user's handwritten annotations to computers of users who were selectively denied from being added to the list of subscribers subscribed to access the first user's handwritten annotations.

2. The method of claim 1 wherein distributing the handwritten annotations comprises combining the first user's handwritten annotations with other handwritten annotations on the public data entry area.

3. The method of claim 2 wherein the public data entry area corresponds to a page of a publication, and wherein receiving handwritten annotations comprises receiving handwritten strokes corresponding to the page.

4. The method of claim 1 wherein distributing the handwritten annotations to comprising combining the first user's handwritten annotations with other handwritten annotations on a graffiti page.

5. The method of claim 4 wherein receiving handwritten annotations comprises receiving handwritten strokes independent of any page of a publication.

6. The method of claim 1 wherein distributing the handwritten annotations comprises automatically updating a subscriber.

7. The method of claim 1 further comprising, receiving a request from a computing device corresponding to a subscriber, and wherein distributing the handwritten annotations comprises providing the handwritten annotations in response to the request.

8. The method of claim 1 further comprising, persisting the handwritten annotations.

9. The method of claim 8 further comprising, receiving data corresponding to a page of a publication, and wherein persisting the handwritten annotations comprises persisting the handwritten annotations in association with the page.

10. A computer storage medium having computer-executable instructions for performing the method of claim 1.

11. In a computer network having a server's computer and clients' computers for propagating annotations to electronic documents among a plurality of clients' computers, a system for sharing handwritten annotation data related to one or more pages of a document among a plurality of clients' computers associated with the document, the system comprising:

annotation devices that are clients' computers of the server's computer, each of the annotation devices including an annotations program that manages handwritten annotations input by each of a plurality of clients at each of the clients' computers, respectively, each of the clients' computers having annotation access to a public data entry area available to each of the clients' computers, the public data entry area being configured for sharing handwritten annotations received from one or more of the clients' computers with one or more other of the clients' computers such that the received handwritten annotations appear to be written on a common display surface shared among the clients' computers in real time, and includes at least one operating mode configured to write the received handwritten annotations of each of the plurality of clients at each of the clients' computers, respectively to a the public data entry area in response to a determination that the received handwritten annotations are public data;

a determining mechanism that determines that the handwritten annotations of a first client are public data;

a display means that displays a list of clients who provided public data on the clients' display devices and displays a list of subscribers who subscribe to the first client's handwritten annotations;

a subscription determining mechanism that:
  receives at least one subscription request from one or more of the clients' computer to subscribe to the first client's handwritten annotations in response to a selection of the first client in the list of clients who provided public data;
  adds at least one of the plurality of clients to a list of subscribers that are subscribed to access the first client's handwritten annotations based on the received at least one subscription request;
  selectively denies on a per-client basis at least one of the clients' computer from being added to the list of subscribers that are subscribed to access the first client's handwritten annotations based on the received at least one subscription request;
  determines that the first client has indicated in the displayed list of subscribers that one or more of the subscribers that are subscribed to the first client's handwritten annotations is to be denied subscription to the first client's handwritten annotations; and
  based on the indicated determination, selectively denying on a per-client basis the one or more of the subscribers indicated by the first client to be denied subscription to the first client's handwritten annotations from being added to the list of subscribers that are subscribed to access the first client's handwritten annotations;

a send mechanism that sends the first client's handwritten annotations to the server's computer for distribution to computers of clients who are on the list of subscribers to access the first client's annotations; and a distribution prevention mechanism that prevents distribution of the first client's handwritten annotations to computers of clients who were selectively denied from being added to the list of subscribers subscribed to access the first client's handwritten annotations.

12. The system of claim 11 wherein the send mechanism comprises a background send thread of the annotation device.

13. The system of claim 11 wherein the annotation program displays a page of a publication, and wherein the handwritten annotations are received in association with the displayed page.

14. The method of claim 11 wherein the annotation program send mechanism provides an identity of the first user, and identifier of the page of the publication and stroke data corresponding the handwritten annotations to the server's computer.

15. The system of claim 11 wherein the annotations program includes at least one other operating mode in which received handwritten annotations are private.

16. The method of claim 11 wherein annotations program provides at least one warning to the first client when the operating mode is one in which the input handwritten annotations are to be published.

17. The method of claim 11 wherein one operating mode in which received handwritten annotations are to be published comprises a presentation page notation mode in which handwritten annotations are distributed by the server's computer to subscribed clients' computers.

18. The method of claim 11 wherein one operating mode in which received handwritten annotations are to be published comprises a shared canvas mode corresponding to a publication page in which handwritten annotations are distributed by the server's computer to any other clients' computer in association with that publication page.

19. The method of claim 11 wherein one operating mode in which received handwritten annotations are to be published comprises a graffiti page canvas mode in which handwritten annotations are distributed by the server's computer to any other clients' computer.

20. The method of claim 19 wherein the handwritten annotation device combines the received published handwritten annotations with the handwritten annotations input by a client for displaying to that client.

21. The system of claim 19 wherein the receive mechanism comprises a background receive thread.

22. The method of claim 11 wherein the annotations device includes a receive mechanism that receives handwritten annotations published by at least one other client and provides the handwritten annotations to the annotation program for presentation.

23. The system of claim 11 wherein the received handwritten annotations correspond to a shared canvas mode in which any client receives data from any other handwritten annotations publisher in association with a publication page.

24. The system of claim 11 wherein the received handwritten annotations correspond to a graffiti mode in which any client receives data from any publisher that is operating in the graffiti mode.

25. The system of claim 11 wherein the annotation device further comprises a mechanism for subscribing to receive the public handwritten annotations of another client.

26. The system of claim 11 wherein the annotation device further comprises a mechanism for filtering which handwritten annotations are presented.

27. In a computing environment for propagating annotations to electronic documents among a plurality of users' computers, a method for sharing handwritten annotation data related to one or more pages of a document among a plurality of users' computers associated, with the document, the method comprising:
  an act of receiving a first user's handwritten annotations from the first user's computer among a plurality of users' computers, each of the users' computers having annotation access to a public data entry area available to each of the plurality of users' computers, the public data entry area being configured for sharing handwritten annotations received from one or more of the plurality of users' computers with one or more other of the plurality of users' computers such that the received handwritten annotations appear to be written on a common display surface shared among the plurality of users' computers in real time;
  an act of determining in a first determination that at least a portion of the handwritten annotations are public handwritten annotations and that at least a portion of the handwritten annotations are private handwritten annotations;
  an act of managing how the public and private handwritten annotations are shared among a plurality of users' computers including:
    an act of managing the sharing of the public handwritten annotations including:

an act of automatically writing the at least a portion of the public handwritten annotations of the first user to the public data entry area in response to the first determination in a first color associated with the public handwritten annotations; and an act of the first user subscribing to the first user's public handwritten annotations such that the first user is enabled to see what other subscribers, who subscribe to the first user's public handwritten annotations, are seeing without the first user's private annotations also appearing on a display of the first user; and an act of managing the sharing of the private handwritten annotations including:

an act of displaying a list of users who provided private handwritten annotations for the users to subscribe to;

an act of receiving at least one subscription request from one or more of the plurality of users' computers to subscribe to the first user's private handwritten annotations in response to a selection of the first user in the list of users who provided private handwritten annotations;

an act of adding at least one of the plurality of-users to a list of subscribers that are subscribed to access the first user's private handwritten annotations based on the received subscription request;

an act of displaying on the first user's display the list of subscribers to the first user's private handwritten annotations;

an act of determining in a second determination that the first user has indicated in the displayed list of subscribers that one or more of the subscribers that, are subscribed to the first user's private handwritten annotations is to be denied subscription to the first user's private handwritten annotations;

based on the second determination, an act of selectively denying on a per-user basis the one or more users indicated by the first user to be denied subscription to the first user's private handwritten annotations from being added to the list of subscribers that are subscribed to access the first user's handwritten annotations;

an act of distributing the first user's private handwritten annotations to computers of users who are on the list of subscribers to the first user's private annotations in a second color associated with private handwritten annotations; and an act of preventing distribution of the first user's private handwritten annotations to computers of users who were selectively denied from being added to the list of subscribers subscribed to access the first user's private handwritten annotations.

28. The method of claim 27, further comprising using a time-based filter to limit the handwritten annotations displayed with the document on the public data entry area to those handwritten annotations input before a certain time or date.

29. The method of claim 27, further comprising using an author-based filter to limit the annotations displayed with the document on the public data entry area to handwritten annotations input by one or more specified users.

* * * * *

UNITED STATES PATENT AND TRADEMARK OFFICE
CERTIFICATE OF CORRECTION

PATENT NO.           : 7,373,590 B2                                           Page 1 of 1
APPLICATION NO.      : 10/676366
DATED                : May 13, 2008
INVENTOR(S)          : Susan D. Woolf et al.

It is certified that error appears in the above-identified patent and that said Letters Patent is hereby corrected as shown below:

In column 13, line 1, in Claim 11, after "to" delete "a".

In column 13, line 54, in Claim 14, delete "claim 11" and insert -- claim 13 --, therefor.

Signed and Sealed this

Fifteenth Day of February, 2011

David J. Kappos
*Director of the United States Patent and Trademark Office*